United States Patent
Lievanos et al.

(10) Patent No.: US 12,247,565 B2
(45) Date of Patent: Mar. 11, 2025

(54) ROTOR SHAFT HUB AND BEARING FOR A HIGH PRESSURE FLUID PUMP ASSEMBLY

(71) Applicants: David Anthony Lievanos, Ferndale, WA (US); Jared Aaron Martin, Lake Havasu, AZ (US)

(72) Inventors: David Anthony Lievanos, Ferndale, WA (US); Jared Aaron Martin, Lake Havasu, AZ (US)

(73) Assignee: M & M Technologies, Inc., Lynden, WA (US)

( * ) Notice: Subject to any disclaimer, the term of this patent is extended or adjusted under 35 U.S.C. 154(b) by 0 days.

(21) Appl. No.: 18/202,855

(22) Filed: May 26, 2023

(65) Prior Publication Data

US 2024/0392781 A1    Nov. 28, 2024

(51) Int. Cl.
| | |
|---|---|
| *F04C 11/00* | (2006.01) |
| *F01C 21/02* | (2006.01) |
| *F04C 2/10* | (2006.01) |
| *F04C 15/00* | (2006.01) |
| *F16C 35/063* | (2006.01) |

(52) U.S. Cl.
CPC ............ *F04C 11/001* (2013.01); *F01C 21/02* (2013.01); *F04C 2/101* (2013.01); *F04C 15/0038* (2013.01); *F04C 15/0076* (2013.01); *F16C 35/063* (2013.01); *F04C 2240/20* (2013.01); *F04C 2240/50* (2013.01); *F04C 2240/56* (2013.01); *F04C 2240/60* (2013.01); *F04C 2240/70* (2013.01)

(58) Field of Classification Search
CPC .... F04C 11/001; F04C 2/101; F04C 15/0038; F04C 15/0076; F04C 2240/20; F04C 2240/50; F04C 2240/56; F04C 2240/60; F04C 2240/70; F01C 21/02; F16C 35/063
See application file for complete search history.

(56) References Cited

U.S. PATENT DOCUMENTS

| | | | | |
|---|---|---|---|---|
| 5,180,297 A | * | 1/1993 | Hansen | F16J 15/36 418/104 |
| 7,014,436 B2 | * | 3/2006 | Klassen | F04C 11/001 418/206.5 |

OTHER PUBLICATIONS

Chinese Foreign Patent Publication and Machine Translation for CN 113623200 A, Inventor: Qu et al; Title: A Synchronous Rotary Multi-phase Multi-stage Submersible Oil Mixing Pump; Published: Nov. 9, 2021. (Year: 2021).*

* cited by examiner

*Primary Examiner* — Mary A Davis
(74) *Attorney, Agent, or Firm* — Morland C. Fischer (57) ABSTRACT

Disclosed is a hub and a bearing which cooperate to hold a shaft in steady axial alignment with a rotor. In a preferred embodiment, the shaft is coupled to the rotor of a fluid gear pump. The gear pump is located in a pump assembly between a front cover and a rear casing. A hub receiving pocket is formed in the front cover, and the hub is connected to the front cover for receipt within the hub receiving pocket. The bearing is surrounded by the hub such that the shaft runs through the bearing to be coupled to the rotor of the gear pump. A pair of high pressure seals are located within the hub at which to surround the shaft and prevent leakage. The bearing being surrounded by the hub stabilizes the shaft to minimize wobbling in response to axial and radial loads to which the shaft is subjected while rotating.

7 Claims, 12 Drawing Sheets

ROTOR SHAFT HUB AND BEARING FOR A HIGH PRESSURE FLUID PUMP ASSEMBLY

BACKGROUND OF THE INVENTION

1. Field of the Invention

This invention relates to a universal hub and a bearing that cooperate with one another to support and hold a shaft in axial alignment with a rotor to minimize wobbling as a consequence of axial and radial loads that are often encountered by the shaft as it rotates the rotor. In a preferred embodiment, the shaft is coupled to the rotor of a gear pump that is adapted to efficiently pump a fluid when operating at high pressures.

2. Background Art

U.S. Pat. No. 7,014,436 issued Mar. 21, 2006 describes a gear pump having a driving rotor and a driven rotor. The driving rotor of the gear pump is rotated by a shaft, and the rotation of the driving rotor is imparted to the driven rotor to cause a fluid that is delivered to the pump at a fluid inlet port to be discharged from the pump by way of a fluid outlet port.

It is known to use a bearing in pump applications such as the gear pump referred to above to enable a rotating shaft to react to radial and axial loads to which the shaft is subjected. Such loads are often caused by severe fatigue and the shaft being used in a high pressure environment. In this case, a complex bearing system has been employed to stabilize the shaft and avoid its vibrating and moving in multiple directions which can cause the rotating shaft to move out of its intended alignment with the driving rotor. Such complex bearing systems include, but are not limited to, front and/or back as well as upper and/or lower supports that are offset along the length of the shaft. These conventional bearing arrangements result in substantial wear of the bearing, especially if the shaft bends or flexes which may cause both an undesirable walking or a misalignment at the inner and outer diameters of the bearing and scoring of the bearing assembly. As a result of an uneven loading, the conventional bearing may experience a brindelling of the bearing races and a reduced life. In this same regard, the cost and time required to repair or replace one of the aforementioned conventional bearing arrangements can be significant.

SUMMARY OF THE INVENTION

In general terms, described below is a pump assembly that has particular application for pumping a fluid (e.g., water) at high pressures. In a preferred embodiment, the assembly includes a gear pump having a driving rotor that is rotated by a shaft to correspondingly cause the rotation of a driven rotor that surrounds the driving rotor. The gear pump is located between a front cover at one end of the pump assembly and a pump casing at the opposite end.

A hub boss alignment pocket is formed in the front cover of the pump assembly and a hub is bolted to the front cover for receipt within the hub alignment pocket. The hub includes a mounting flange that is attached to the front cover. A cylindrical self-aligning bearing pocket is located at one face of the mounting flanges, and a hub alignment boss is located at the opposite face to be received within the hub boss alignment pocket that is formed in the front cover. A shaft pass-through runs longitudinally through the mounting flange and the hub alignment boss of the hub within which to receive the shaft.

Located within the self-aligning bearing pocket of the hub is a bearing. The bearing includes a cylindrical outer race that is press-fit within the bearing pocket of the hub. The outer race of the bearing surrounds a cylindrical inner race. A shaft passage of the bearing is coaxially aligned with the inner race, and the shaft runs through the shaft passage to be coupled to the driving rotor of the gear pump. To this end, the shaft passage through the inner race has a longitudinal axis that is axially aligned with the longitudinally extending shaft pass-through of the hub so that the shaft runs continuously through and is supported by the bearing and the hub that surrounds the bearing. A pair of high pressure seals are located within the hub alignment boss of the hub at which to surround the shaft. The inner race of the bearing is attached to the shaft running therethrough by set screws such that the bearing rotates with the shaft within the hub. A plurality of ball bearings are seated on and carried by a roller cage that surrounds the inner race of the bearing.

Thus, the pump shaft is held in continuous axial alignment with the driving rotor of the gear pump by means of the hub that is mounted on the front cover of the pump assembly and the bearing that is surrounded by the hub within which the shaft is supported. By virtue of the foregoing, the shaft will be stabilized so as to reduce wobbling and any multi-directional movements thereof that are known to be caused by axial and radial loads to which the rotating shaft may be subjected when the gear pump operates at high pressures.

DESCRIPTION OF THE PREFERRED EMBODIMENT

Figure 1:
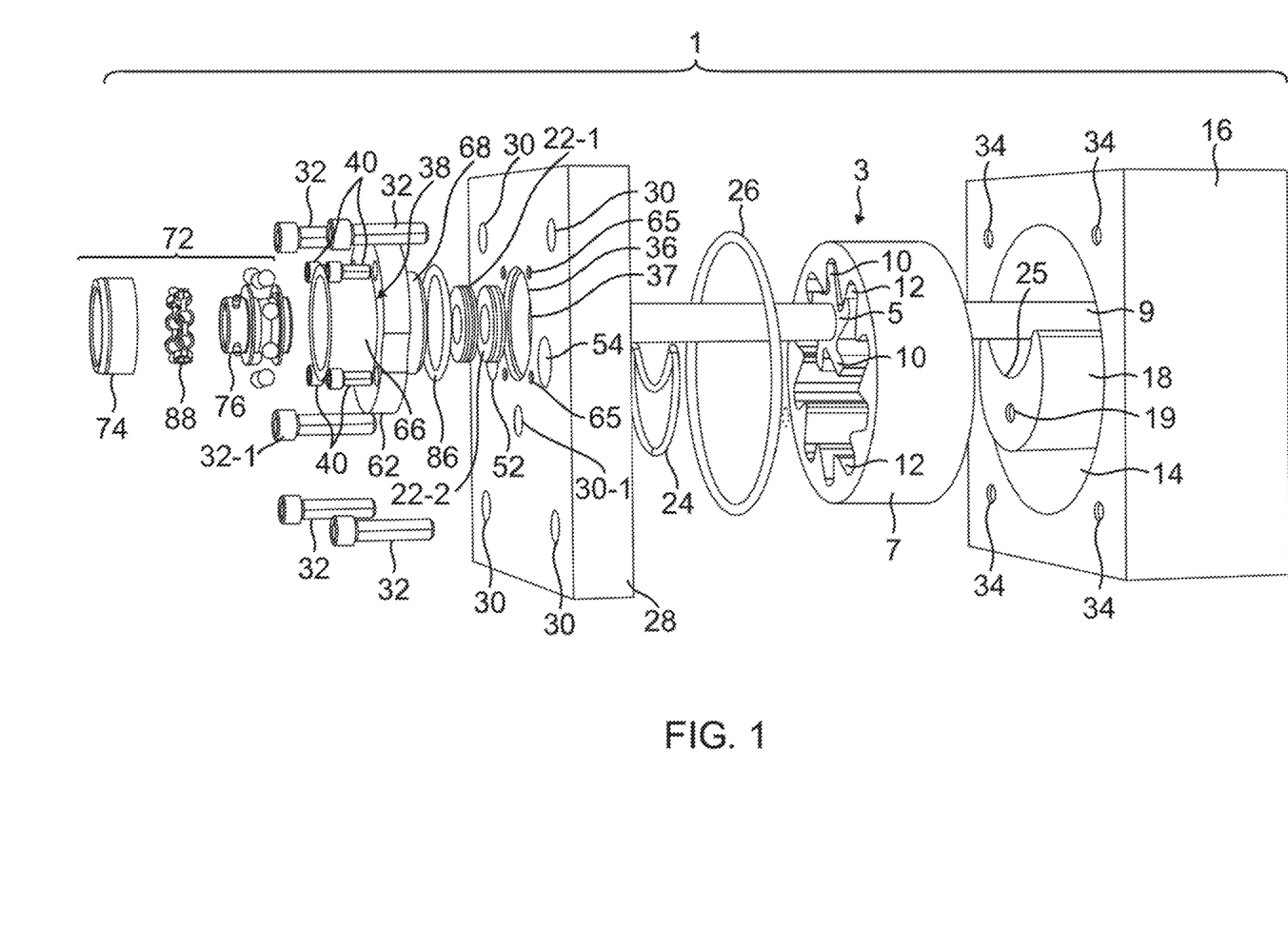
FIG. 1 is an exploded view of a pump assembly that, according to a preferred embodiment, includes a gear pump that is located between a front cover at one end of the assembly and a pump casing at the opposite end.

FIG. 1 of the drawings is an exploded view of a shaft driven pump assembly 1 which is capable of pumping a fluid at high pressures. According to a preferred embodiment of this invention, the pump assembly 1 includes a gear pump 3 containing a driving rotor 5 that is coupled to and surrounded by a cylindrical driven rotor 7 having an open interior. A (e.g., hard chrome) pump shaft 9 that is driven by a servo motor or the like runs through the driven rotor 5 to impart a rotational force thereto. Teeth 10 of the driving rotor 5 are received within respective teeth pockets 12 formed around the open interior of the cylindrical driven rotor 7 so that the rotational force imparted to the driving rotor 5 by the shaft 9 is transferred to the driven rotor 7 to cause a rotation thereof. Details of the gear pump 3 are available by referring to U.S. Pat. No. 7,014,436 issued Mar. 21, 2006, and such details are incorporated herein by reference.

Figure 11:
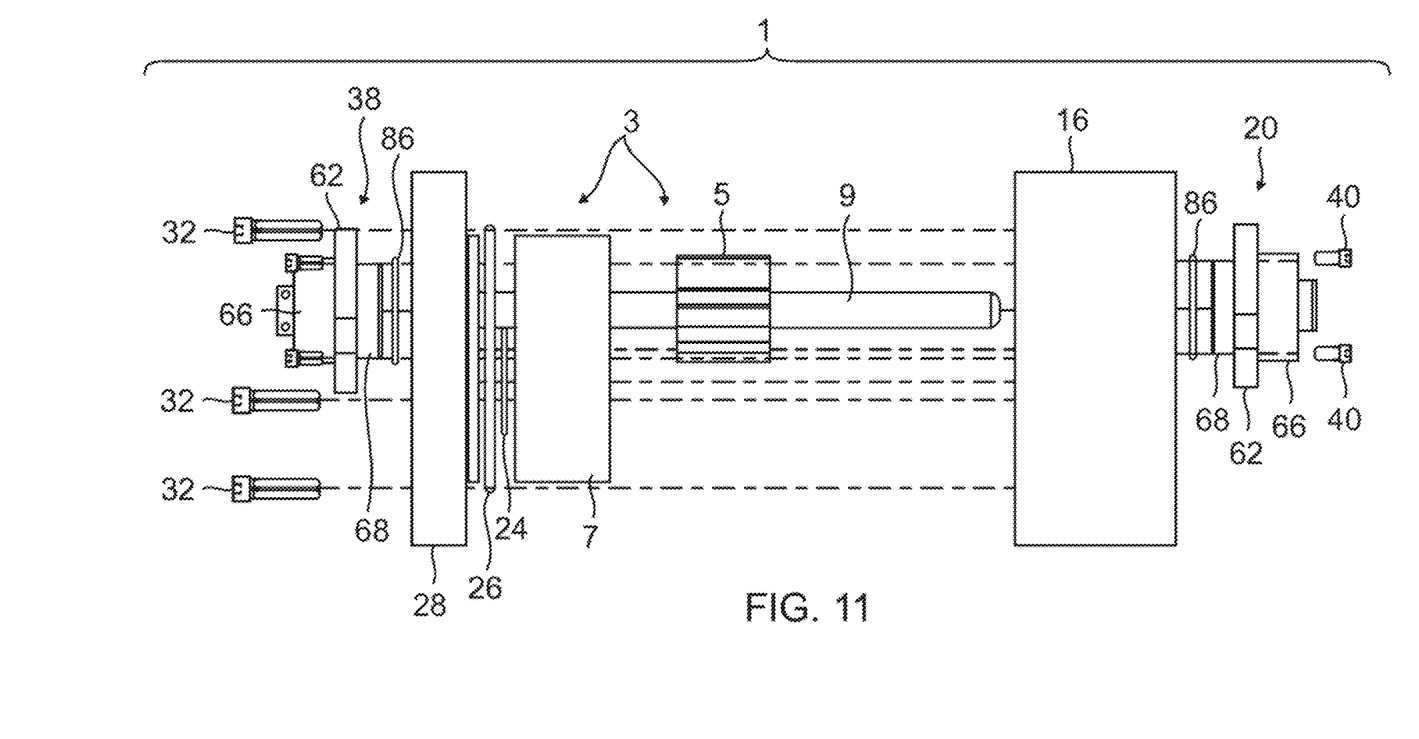
FIG. 11 is an exploded view showing the pump shaft extending between the front cover and the pump casing of the pump assembly with the first end of the shaft held in coaxial alignment with and coupled to a driving rotor of the gear pump.
Figure 13:
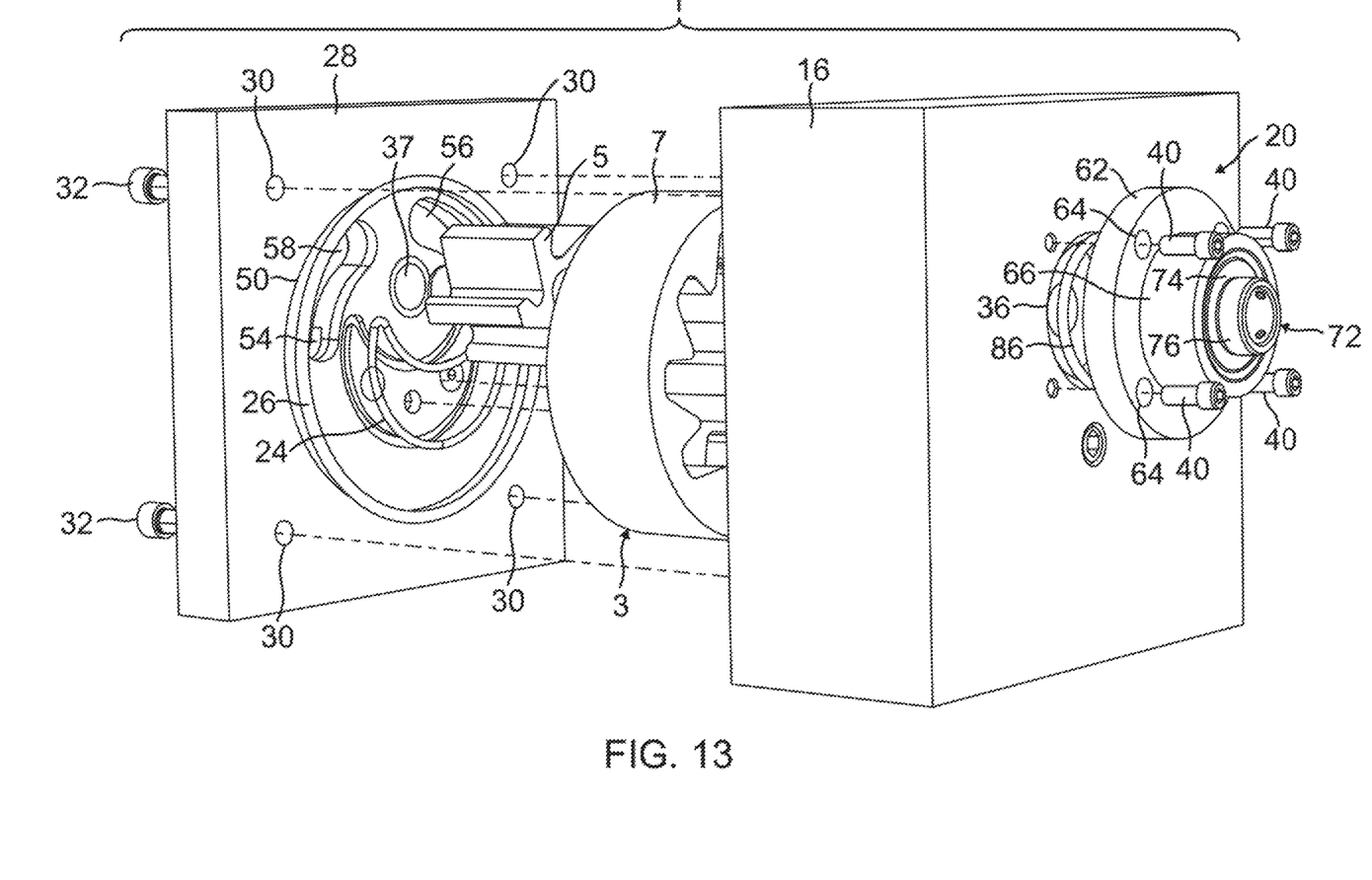
FIG. 13 is an exploded view showing a rear facing universal hub to be mounted on the pump casing at the opposite end of the pump assembly within which to receive a bearing that surrounds and supports the opposite end of the pump shaft.

The cylindrical driven rotor 7 of the gear pump 3 is received within a driven rotor casing pocket 14 that is formed in a pump casing 16 at the back of the pump assembly. Located within the interior of the driven rotor 7 of the pump 3 is a solid moon-shaped rotor seal 18 to stabilize the driving rotor 5 when it is rotated by the shaft 9. A seal connection hole 19 runs through the rotor seal 18. A first end of the pump shaft 9 that imparts a rotation to the driving rotor 5 extends continuously through the driving rotor 5 and the rotor pocket 14. As is best shown in FIGS. 11 and 13, the opposite end of shaft 9 may extend outwardly from and beyond the pump casing 16 to be attached to an optional rear facing hub 20 that will be described when referring to FIG. 13 hereinafter. Pairs of high performance seals 22-1 and 22-2 (only one pair being shown in FIG. 1) that are stacked one against the other are positioned to surround each of the first and opposite ends of the shaft 9. Details of the seals 21-1 and 22-2 will be provided when referring to FIG. 15.

A resilient O-ring seal 24 having a moon-shape is configured to be moved into the open interior of the driven rotor 7 of the gear pump 3 to surround the corresponding moon-shaped rotor seal 18. A circular front cover O-ring pressure seal 26 is seated within a circular high pressure seal pocket (designated 50 in FIG. 2) that is formed in the rear of a front cover 28 of the pump assembly 1 that lies opposite the pump casing 16. The moon-shaped rotor seal 18 has a depression 25 formed therein by which to accommodate the driving rotor 5 as it is rotated by the shaft 9 within the pump 3.

The front cover 28 of the pump assembly 1 is connected to the pump casing 16 that lies at the opposite rear end thereof. To this end, the front cover 28 has a plurality of (e.g., four) bolt holes 30 formed therethrough. A corresponding plurality of bolts 32 extend through the bolt holes 30 for receipt within respective threaded bolt holes 34 formed in the pump casing 16, such that the pump casing 16 and the front cover 28 are connected together and the gear pump 3 is located within the driven rotor casing pocket 14 of the pump assembly 1 between the pump casing 16 and the front cover 28. An additional bolt hole 30-1 is formed in the front cover 28 to receive an additional bolt 32-1 therethrough. The bolt 32-1 extends through the seal connection hole 19 that is formed in the moon-shaped rotor seal 18, whereby the seal 18 is held in place against the high pressure seal pocket 50 at the rear of the front cover 28 (best shown in FIG. 2).

A hub boss alignment pocket 36 is formed in the front cover 28 of the pump assembly 1. A shaft receiving hole 37 (best shown in FIG. 12) that is formed through the front cover 28 communicates with the hub pocket 36. Located within the hub alignment pocket 36 is a soon to be described front facing universal hub 38 (best shown in FIGS. 3 and 4) that is identical to the optional rear facing hub 20 of FIGS. 11 and 13 which supports the opposite end of the pump shaft 9 that extends outwardly from the pump casing 16. The front facing hub 38 surrounds a bearing 72 which supports the first end of the pump shaft 9 that extends through the shaft receiving hole 37 at the front cover 28 to the gear pump 3. As is best shown in FIG. 11, the first end of the shaft 9 is adapted to impart a rotation to the driving rotor 5 of pump 3 which in turn imparts a rotation to the driven rotor 7.

Figure 2:
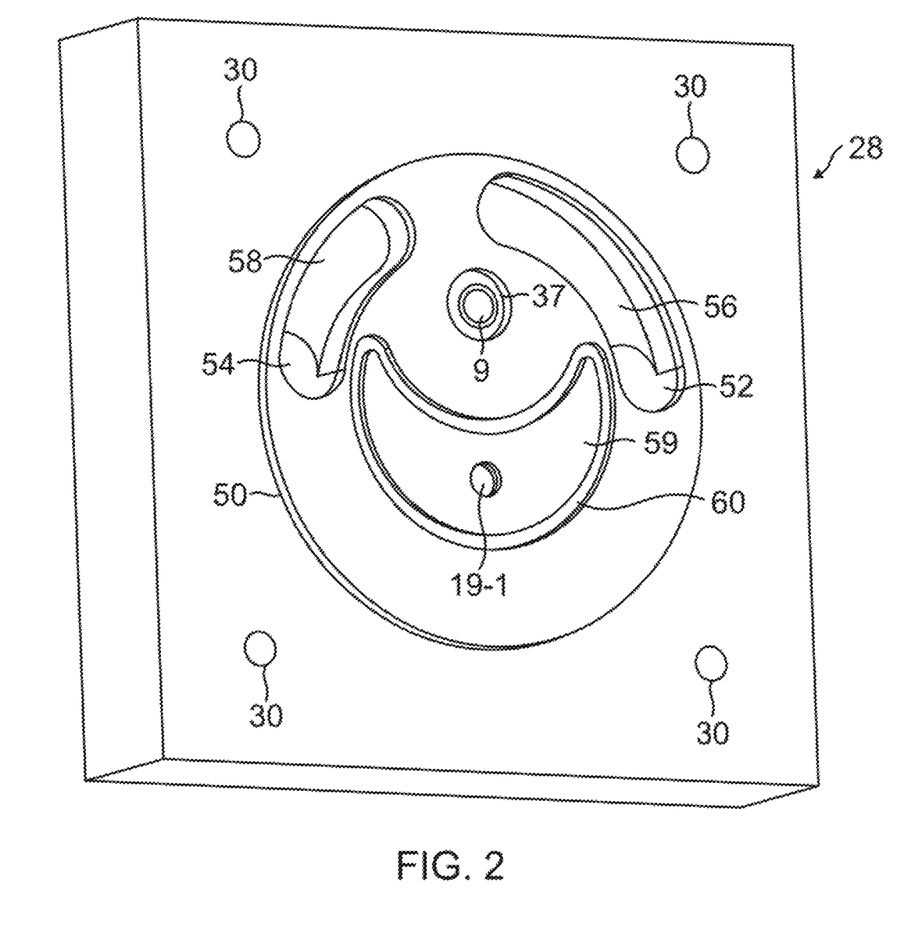
FIG. 2 shows the back of the front cover of the pump assembly of FIG. 1.

FIG. 2 of the drawings shows the rear of the front cover 28 of the pump assembly 1 of FIG. 1 and a circular high pressure seal pocket 50 recessed therein. A bolt hole 19-1 runs through the seal pocket 50 to receive the bolt (32-1 of FIG. 1) by which to hold the moon-shaped rotor seal (18 of FIG. 1) against the rear of the front cover 28. As is best shown in FIG. 13, the front cover O-ring seal 26 shown in FIG. 1 extends around the circumference of seal pocket 50. The shaft receiving hole 37 that communicates with the hub boss alignment pocket (36 of FIG. 1) within which the front facing hub (38 of FIG. 1) is received runs through the front cover 38, and the pump shaft 9 runs through the shaft receiving hole 37 for connection to the gear pump 3 of FIG. 1. The gear pump 3 is arranged with respect to the front facing hub 38 so that the driving rotor (5 of FIG. 1) of the pump is axially aligned with the hub boss alignment pocket 36. More particularly, and as is best shown in FIG. 11, the pump shaft 9 which imparts a rotation to the driving rotor 5 is coaxially aligned with respect to each of the hub boss alignment pocket 36, the shaft receiving hole 37, the front facing hub 38, the driving rotor 5, and the rear facing hub 20.

A fluid inlet port 52 through front cover 28 is located at one side of the shaft receiving opening 37, and a fluid outlet port 54 through the front cover 28 is located at the opposite side. An adjustable (i.e., variable depth) fluid intake channel 56 runs upwardly from the fluid inlet port 52 to curve above the shaft receiving opening 37. An adjustable (i.e., variable depth) fluid discharge channel 58 runs upwardly from the fluid outlet port 54 to curve above the hub shaft receiving opening 37 opposite the fluid intake channel 56. Located within the high pressure seal pocket 50 of the front cover 28 so as to lie below the driving rotor 5 of FIG. 1 is a base 59 on which the moon-shaped rotor seal 18 of FIG. 1 is seated. A peripheral race 60 runs around the base 59 within which to receive the moon-shaped O-ring seal (designated 24 in FIG. 1). As was previously explained, the rotor seal 18 has a depression 25 within which to accommodate the driving rotor 5 of gear pump 3. Fluid (e.g., water) flowing into the pump 3 of the pump assembly 1 of FIG. 1 at the fluid inlet port 52 is carried within the pockets 12 of the driven rotor 7 around the bottom of the rotor seal 18 to the fluid outlet port 54. Fluid is also moved between the inlet and outlet ports 52 and 54 by the teeth 10 of the driving rotor 5 along the depression 25 that is formed in the top of the rotor seal 18. The presence of rotor seal 18 prevents fluid from flowing out of the fluid path as it travels between the fluid inlet and outlet ports 52 and 54.

The front facing universal hub 38 is now described to be mounted on the front cover 28 of the pump assembly 1 by which to hold the first end of the pump shaft 9 in axial alignment with the driving rotor 5 of the pump 3 shown in FIG. 1. Although the front facing hub 38 will be described, it is to be understood that the front and rear facing hubs 38 and 20 shown in FIGS. 1 and 13 at opposite ends of the pump assembly 1 can be identical.

Referring in this regard to FIGS. 3-6 of the drawings, the hub 38 that is preferably manufactured from aluminum or stainless steel is shown with a wide mounting flange 62 having bolt holes 64 formed therethrough for receipt of respective bolts (designated 40 in FIG. 1) to connect the hub to the front of the front cover 28. A cylindrical wide diameter self-aligning bearing pocket 66 stands outwardly from one face of the mounting flange 62, and a cylindrical narrow diameter hub alignment boss 68 stands outwardly from the opposite face of flange 62. A shaft pass-through 70 runs longitudinally through the mounting flange 62 and the hub alignment boss 68 of the hub 38 within which to receive the pump shaft 9. The hub 38 is connected to the front cover 28 so that the hub alignment boss 68 is received within the hub boss alignment pocket (36 of FIG. 1) formed in the front cover.

Figure 7:
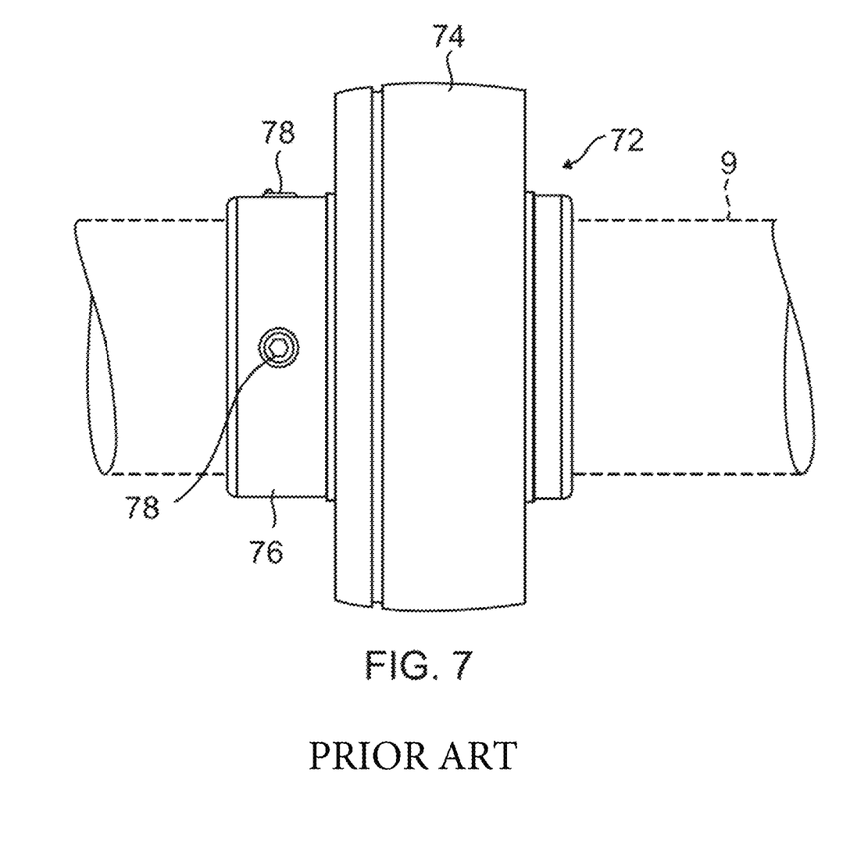
FIG. 7 shows a bearing to be received within the universal hub of FIGS. 3 and 4 at the front cover of the pump assembly through which the first end of a shaft of the gear pump assembly extends to be coupled to the gear pump to impart a rotational force thereto.
Figure 8:
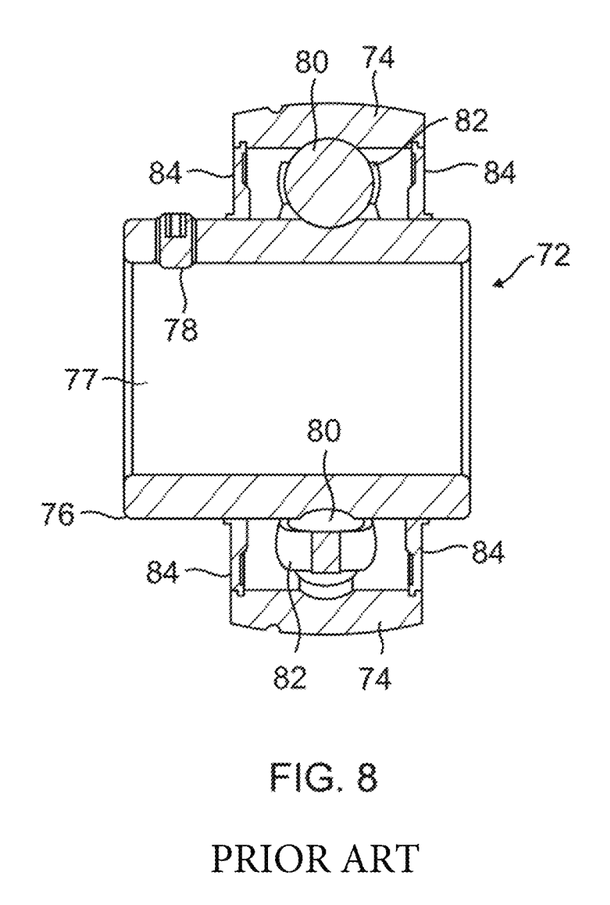
FIG. 8 is a cross-section of the bearing shown in FIG. 7.

The self-aligning bearing pocket 66 of the hub 38 is sized to receive the bearing 72 so as to allow a slight movement of the bearing therewithin to compensate for any misalignment. By way of example only, the bearing 72 is a stainless steel bearing such as that available as Part No. SUC204-12 from NTN Bearing Corporation of America of Mount Prospect, Illinois. Turning to FIGS. 7 and 8 of the drawings, the bearing 72 is shown having a cylindrical outer race 74 that is press-fit within the bearing pocket 66 of hub 38. Spaced inwardly from and surrounded by the outer race 74 is a cylindrical inner race 76. The inner race 76 of bearing 72 has a shaft passage 77 through which the first end of the shaft 9 runs to be coupled to the driving rotor 5 of the gear pump 3. To this end, the shaft passage 77 through the inner race 76 of bearing 72 has a longitudinal axis that is axially aligned with the shaft pass-through 70 of the hub 38.

A number of set screws 78 extend through the inner race 76 to hold the inner race in contact with the pump shaft 9 such that the bearing 72 rotates with the shaft 9 within the hub 38. Located between the outer and the inner races 74 and 76 of bearing 72 are a plurality of ball bearings 80. The ball bearings 80 are seated on and carried by a roller cage 82. Removable dust covers 84 maintain the outer race 74 in spaced coaxial alignment with the inner race 76. Additional details of the bearing 72 and the roller cage 82 will be described when referring to FIG. 15 hereinafter.

Figure 3:
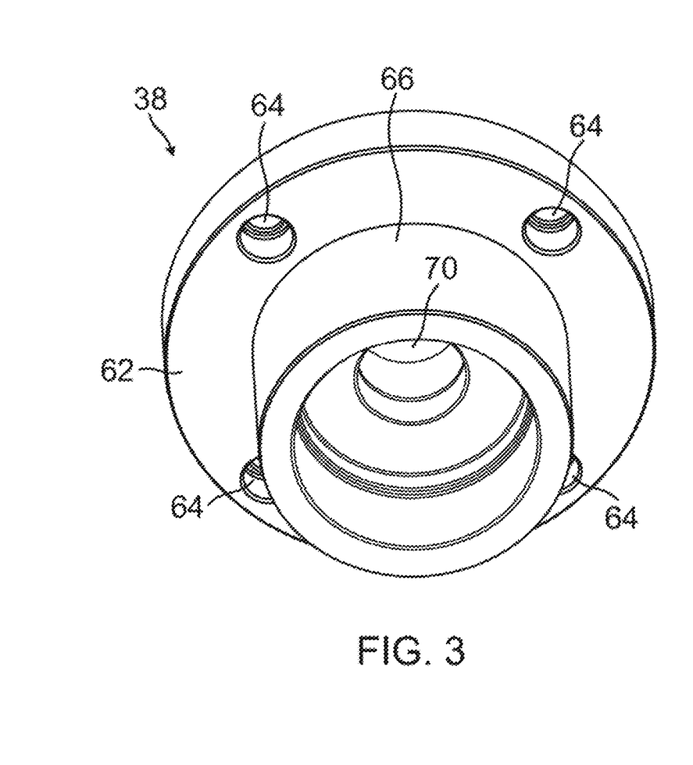
FIG. 3 is a perspective view showing the front of a front facing universal hub to be mounted on the front cover of the pump assembly for receipt within a hub boss alignment pocket that is formed in the front cover.
Figure 4:
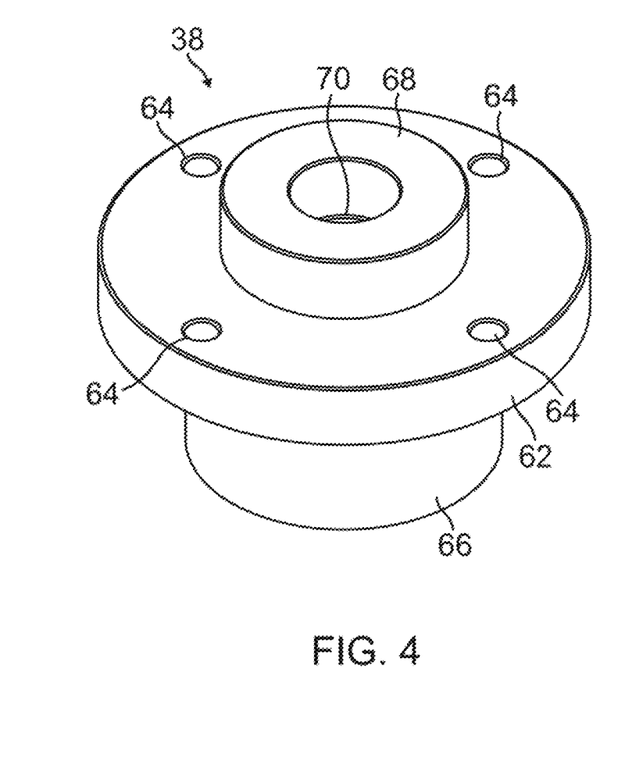
FIG. 4 is a perspective view showing the rear of the universal hub shown in FIG. 3.
Figure 5:
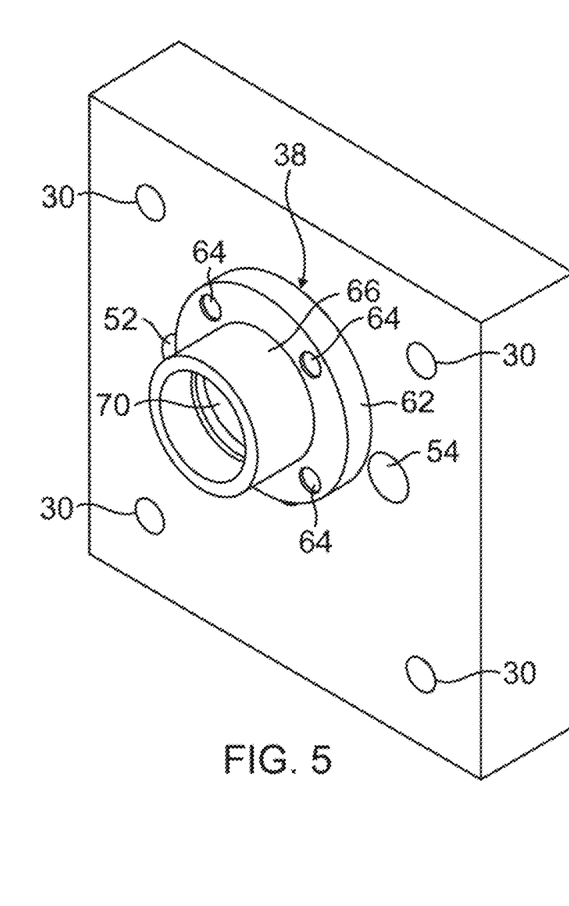
FIG. 5 is a perspective view of the front cover of the pump assembly showing the front facing universal hub of FIGS. 3 and 4 mounted thereon.
Figure 6:
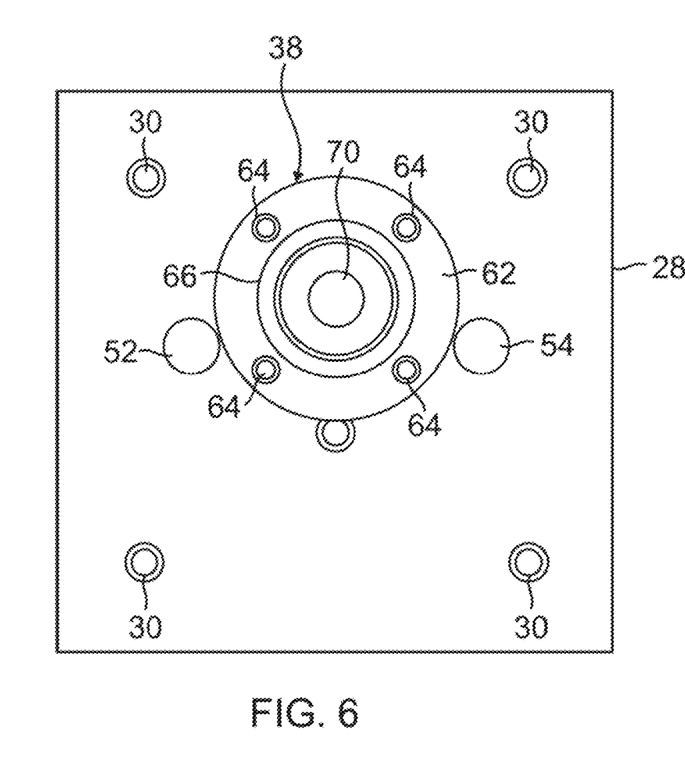
FIG. 6 is a front view of the front cover shown in FIG. 5 having the universal hub mounted thereon.
Figure 9:
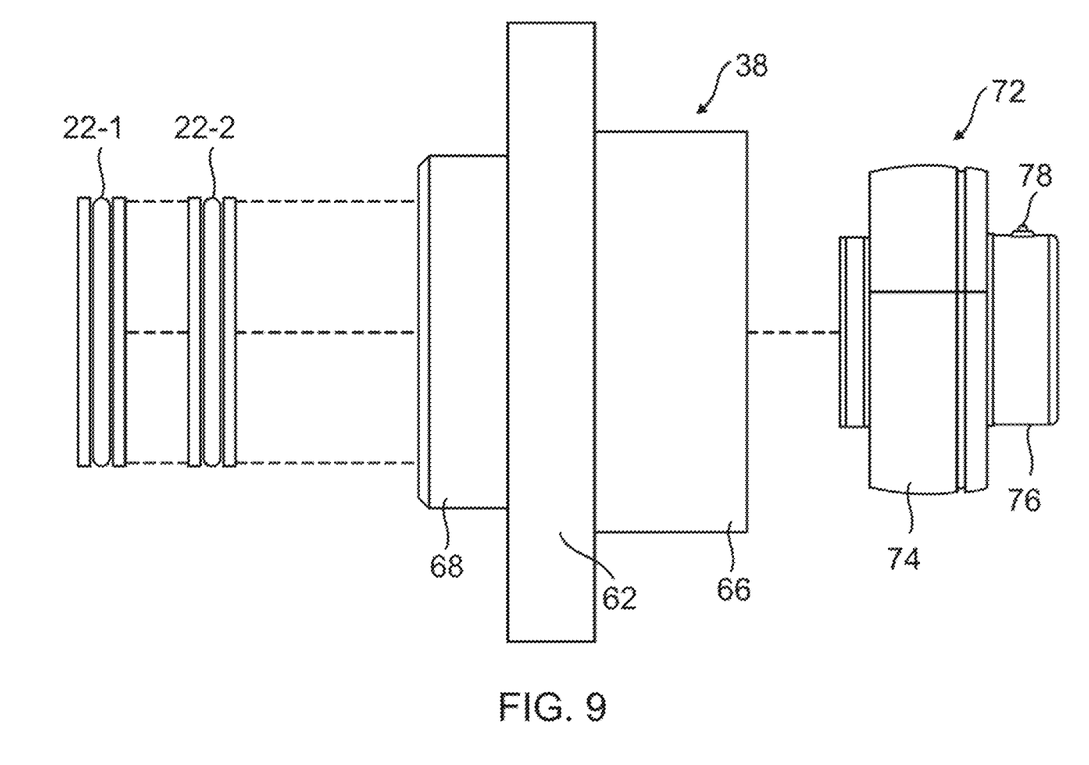
FIG. 9 is an exploded view showing the bearing of FIG. 7 aligned to be received within and surrounded by the universal hub of FIGS. 3 and 4.

FIG. 9 is an exploded view showing the bearing 72 of FIGS. 7 and 8 aligned to be coupled (i.e., press-fit) within the bearing pocket 66 of the front facing bearing hub 38 of FIGS. 3 and 4. One pair of the high pressure seals 22-1 and 22-2 to which reference was made while referring to FIG. 1 are shown to be received within the hub alignment boss 68 of the hub 38 to surround the shaft passing therethrough. Additional details for the pair of seals 22-1 and 22-2 will be described when referring to FIG. 15 hereinafter.

Figure 10:
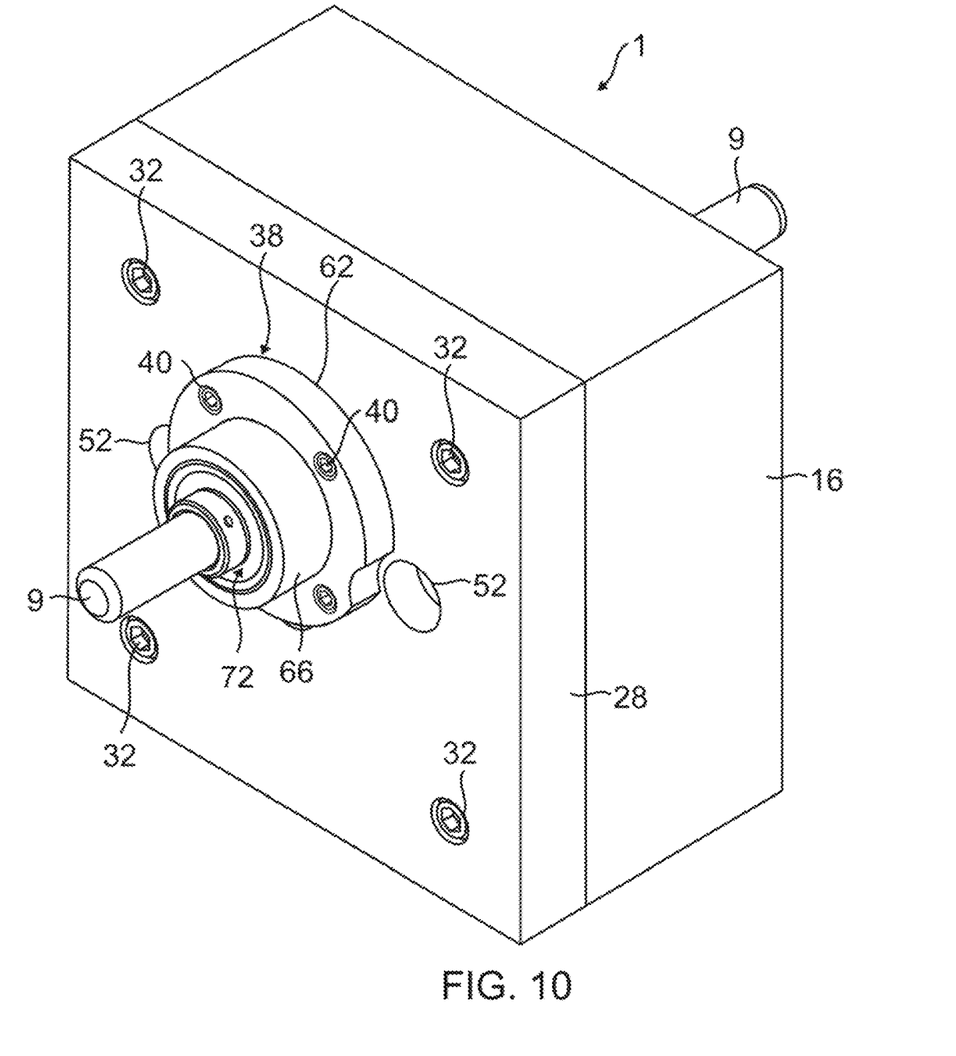
FIG. 10 is a perspective view showing the universal hub of the pump assembly mounted on the front cover and surrounding the bearing of FIG. 7 with the first end of the pump shaft running through the pump assembly and being supported by the bearing.

Turning now to FIG. 10 of the drawings, the pump assembly 1 is shown assembled with the front cover 28 connected by bolts 32 to the pump casing 16. The front facing hub 38 is connected to the front cover 28 at which to surround the bearing 72. Thus, the pump shaft 9 is coaxially aligned for receipt through the hub 38, the bearing 72 surrounded by the hub 38, and the driving rotor 5 of the pump 3 of FIG. 1 so as to extend inwardly through the shaft receiving hole (37 of FIGS. 1 and 2) in the front cover 28 and outwardly through the pump casing 16. FIG. 11 is an exploded view of the assembled pump assembly 1 of FIG. 10 showing the first end of the pump shaft 9 running through the driving rotor 5 of pump 3 that is surrounded by the driven rotor 7 as the shaft extends into the pump assembly by way of the front facing hub 38 that is attached to the front cover 28. FIG. 11 also shows a hub boss O-ring seal 86 to surround the hub alignment boss 68 of hub 38 that is received within the hub boss alignment pocket (36 of FIG. 1) formed in the front cover 28. In the case of FIG. 11, the identical rear facing hub 20 and front facing hub 38 are shown to be coupled to the first and opposite ends of the pump shaft 9.

Figure 12:
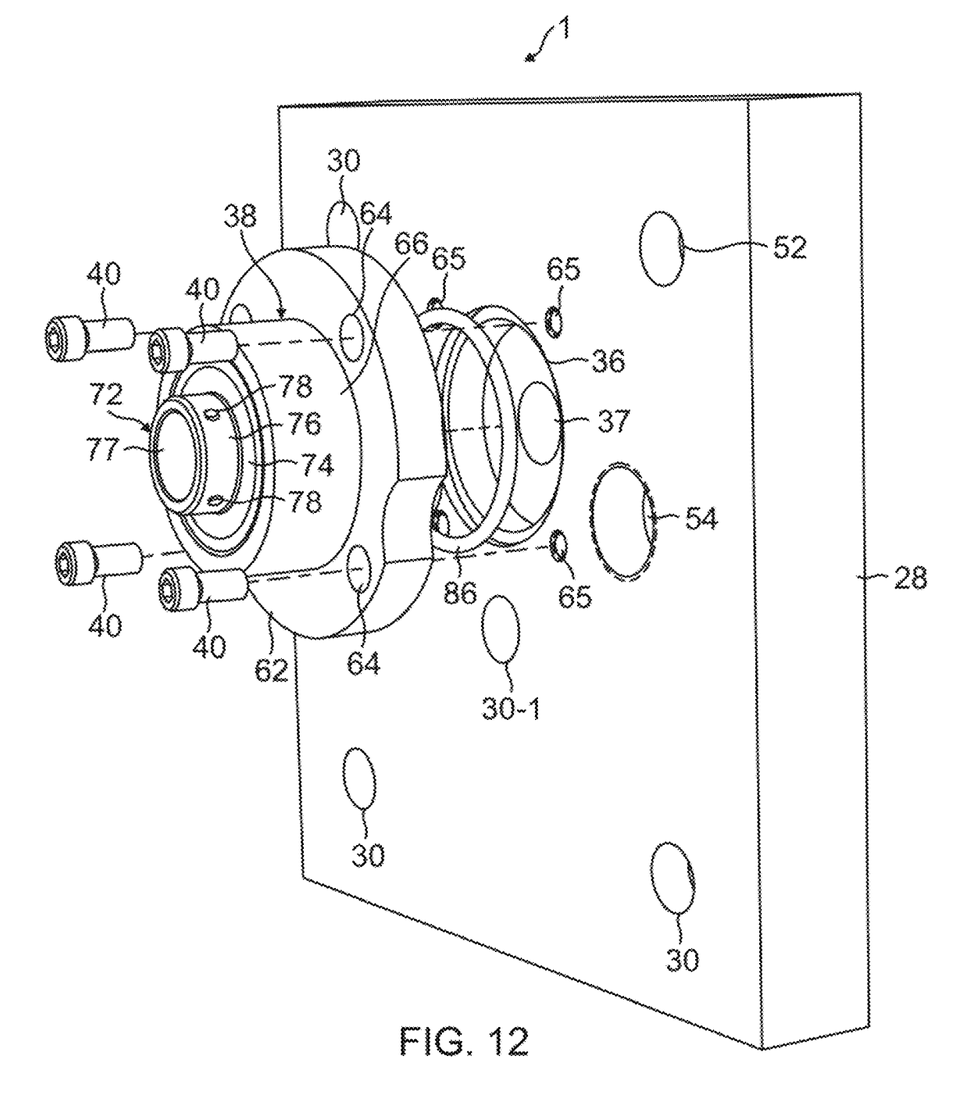
FIG. 12 is an exploded view showing the universal hub surrounding the bearing of FIG. 7 and being mounted on the front cover of the pump assembly for receipt within the hub boss alignment pocket that is formed in the front cover.

FIG. 12 of the drawings is another exploded view by which to show the bearing 72 located within the self-aligning bearing pocket 66 of the front facing hub 38. Also shown in FIG. 12 is the mounting flange 62 of the front facing hub 38 to be connected by bolts 40 to the front cover 28 of the pump assembly 1 via bolt holes 64 formed in the flange 62 and axially aligned bolt holes 65 formed in the front cover 28. At the same time, the hub alignment boss (designated 68 in FIG. 4) of the front facing hub 38 is received within the hub boss alignment pocket 36 that is formed in the front cover 28 to communicate with the shaft receiving opening 37. Accordingly, and as was previously explained, the shaft pass-through 70 (of FIGS. 3-6) that runs through the front facing hub 38 is axially aligned with the shaft passage 77 that runs through the inner race 76 of the bearing 72. Thus, the pump shaft 9 of FIG. 11 will be held in coaxial alignment with the driving rotor 5 of the gear pump 3 by means of its being supported within the bearing 72 that is surrounded by the front facing hub 38.

As previously described, a rear facing hub 20 can be connected to the rear of the pump casing 16 of the pump assembly 1 to support the opposite end of the pump shaft 9 shown in FIG. 10 extending outwardly past pump casing 16. The rear facing hub 20 is connected to the pump casing 16 in the manner shown in FIGS. 11 and 13. With the inclusion of the rear facing hub 20, the pump assembly 1 can be advantageously used within a multi-stage high pressure pump system with a single rotor shaft running continuously through all of the stages.

Figure 14:
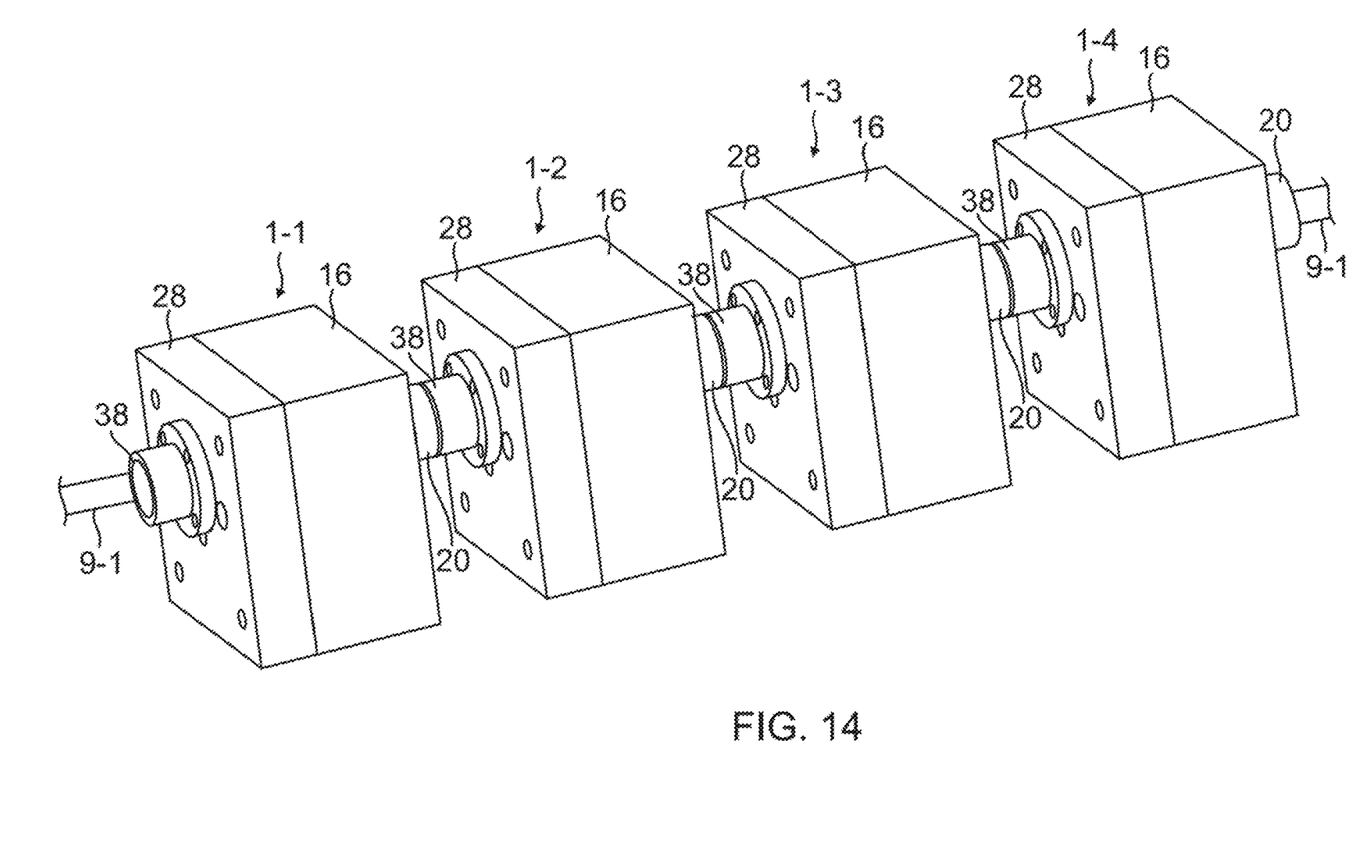
FIG. 14 shows a multiple stage pump system having a plurality of pump assemblies that are identical to the pump assembly shown in FIG. 1 and that are coupled to one another by a single continuously extending shaft.

Referring briefly in this regard to FIG. 14 of the drawings, one example of a multi-stage pump system is shown including a plurality of (e.g., four) pump assemblies 1-1, 1-2, 1-3 and 1-4 that are all identical to the pump assembly 1 of FIG. 1 and are all connected end-to-end one another with a single shaft 9-1 running continuously therethrough. In this case, each pump assembly 1-1 . . . 1-4 has a front facing hub 38 connected to the front cover 28 thereof and a rear facing hub 20 connected to the pump casing 16. In the case where the pump assembly 1 has only a front facing hub 38, a single stage pump assembly like that shown in FIGS. 5 and 6 will otherwise be available.

Referring specifically to FIG. 13, the rear facing hub 20 that enables the pump assembly 1 to be interconnected within a multi-stage pump assembly in the manner shown in FIG. 14 is identical to the front facing hub 38 that is shown in FIG. 12. What is more, the bearing to be received within the self-aligning bearing pocket 66 of the rear facing hub 20 is identical to the bearing 72 of the front facing hub 38. Therefore, identical reference numbers have been used to refer to each of the front and rear facing hubs 38 and 20 and the bearings 72 received therewithin.

Figure 15:
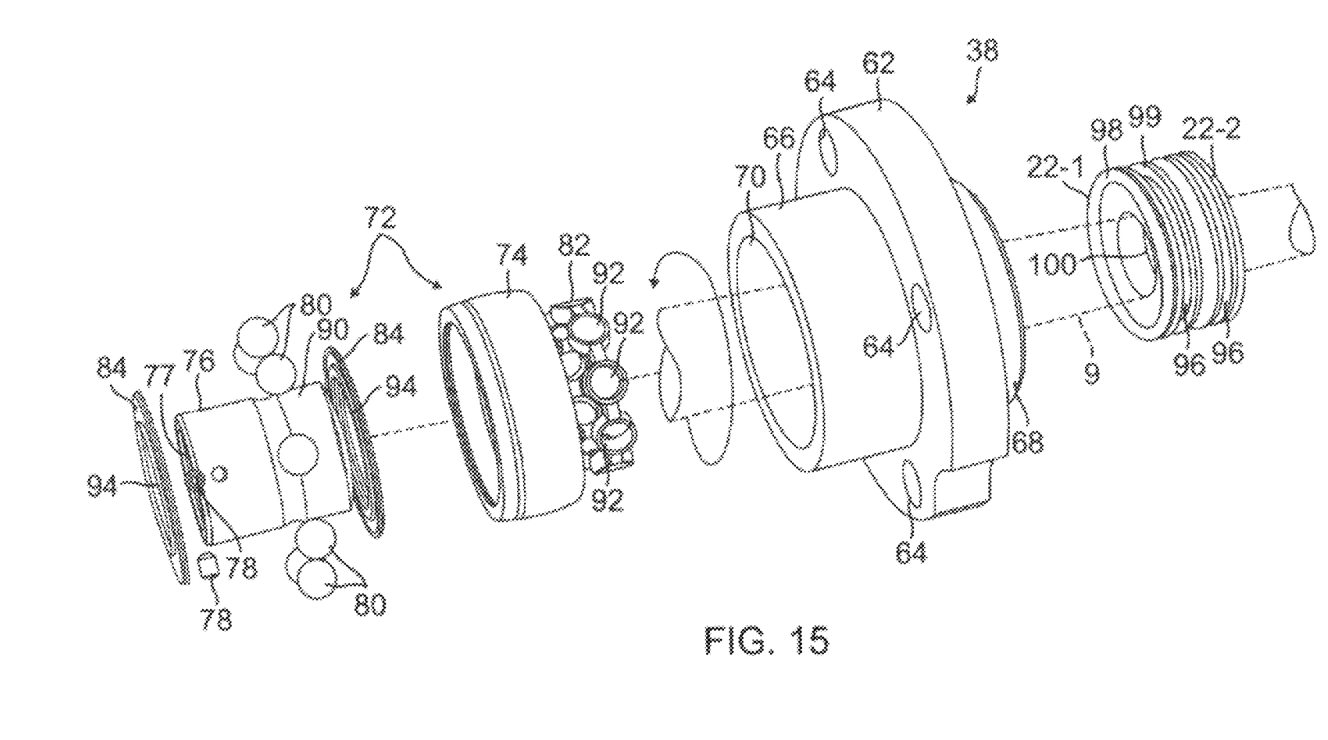
FIG. 15 is an exploded view showing the bearing of FIG. 7 aligned to be received within and surrounded by the universal hub of FIGS. 3 and 4 to support the rotor shaft of the gear pump passing therethrough.

Turning now to FIG. 15 of the drawings, an exploded view is shown by which to best illustrate the bearing 72 that is received within the bearing pocket 66 of the front facing hub 38 that is attached to the front cover 28 of the pump assembly shown in FIG. 12. The rotating pump shaft 9 herein described is known to oscillate up and down and sideways so as to wobble in response to radial and axial loads to which the shaft is exposed during high pressure applications. Consequently, the shaft 9 may move out of its intended alignment with the gear pump 3 so as to negatively impact the efficiency of the pump. To overcome this problem, the bearing 72 of FIG. 15 and the universal hub 38 which surrounds the bearing function to stabilize the shaft and minimize the effects of the multi-directional movements thereof so as to advantageously reduce wobbling. By virtue of the foregoing, the shaft 9 will remain in coaxial alignment with each of the bearing 72 and the shaft passage 77 through the bearing 72, the hub 38 and the shaft pass-through 70 of the hub 38 that surrounds the bearing 72, and the driving rotor of the gear pump 3 of FIG. 13 so as to increase the efficiency of the pump.

A bearing 72 such as that shown in FIG. 15 is available as Part No. SSCUPSKT from McMaster Carr of Santa Fe Springs, California. Therefore, only a brief description of the bearing 72 will now be provided. As previously explained when referring to FIGS. 7 and 8, the bearing 72 includes a cylindrical outer race 74 and a cylindrical inner race 76 that is surrounded by the outer race 74. A ball bearing roller cage 82 that is located within the outer race 74 extends around the inside circumference thereof. The ball bearing cage 82 lies in surrounding engagement with the inner race 76 at a ball bearing track 90 extending therearound. The roller cage 82 carries a plurality of ball bearing pockets 92 in which a corresponding plurality of ball bearings 80 are seated. A dust cover 84 is located across each end of the inner race 76 of bearing 72 to protect the ball bearings 80. Each of the dust covers 84 has an opening 94 formed therein through which to receive the pump shaft 9.

A pair of high pressure single-lip-V spring-loaded rotary shaft seals 22-1 and 22-2 such as those previously described when referring to FIG. 1 are shown stacked back-to-back to surround the pump shaft 9 within the hub alignment boss 68 of the hub 38. The shaft seals prevent the leakage of fluid from the pump assembly when the gear pump operates at high pressure. Each of the seals 22-1 and 22-2 includes an O-ring 96 sandwiched between a pair of sealing rings 98 and 99. Each seal 22-1 and 22-2 also has a center hole 100 through which the shaft 9 extends. Such high pressure seals 22-1 and 22-2 are available as Part No. VS-RS20B from American High Performance Seals of Oakdale, Pennsylvania.

Inasmuch as the inner race 76 of the bearing 72 is attached by means of set screws 78 to the pump shaft 9 which runs through the shaft passage 77 of bearing 72, a rotation of the shaft 9 is imparted to the inner race 76. The ball bearings 80 that are seated within the pockets 92 of the ball bearing cage 82 that lies on the ball bearing track 90 are correspondingly rotated to reduce multi-directional movements and wobbling of the rotating shaft 9. Therefore, as previously described, the bearing 72 and the universal hub 38 of this invention cooperate with one another to advantageously stabilize and hold the pump shaft 9 in a steady coaxial alignment with the driving rotor 5 of the gear pump 3 in order to cause the shaft to rotate with minimal turbulence by which fluid is efficiently pumped through the pump assembly 1.

The advantages of this invention have been described herein as being particularly applicable to high pressure gear pump applications. However, it is to be understood that these same advantages are also applicable to other types of mechanical machines that have a rotating shaft such as other pumps, mixers, stirrers, motors and turbines to name but a few. What is more, such machinery having a rotating shaft can include a multi-stage high pressure pump like that shown in FIG. 14, an electrical generator, a power generator and a wind turbine wherein avoiding a misalignment of a rotating shaft with a shaft driven rotor is necessary to ensure efficient machine operation.

The invention claimed is:

1. A pump assembly for pumping a fluid comprising:
a pump having a driving rotor and a driven rotor that is coupled to and rotated by the driving rotor to cause the fluid to be pumped;
a shaft coupled to the driving rotor, said shaft being rotated to cause the driving rotor of said pump to rotate and to correspondingly impart the rotation thereof to said driven rotor;
a bearing having a shaft passage running longitudinally therethrough within which to receive said shaft in order to maintain said shaft in axial alignment with the driving rotor of said pump;
a hub within which to receive and surround said bearing and thereby minimize wobbling of said shaft in response to axial and radial loads to which said shaft is exposed during the rotation thereof; and
a front cover having a hub receiving pocket formed therein, said hub being received within said hub receiving pocket and said bearing being surrounded by said hub, such that said shaft extends through the shaft passage of said bearing to be axially aligned with and coupled to the driving rotor of said pump,
wherein said hub includes a mounting flange to be connected to said front cover, said mounting flange having first an opposite faces and said hub further including a bearing pocket located at the first face of said mounting flange for the receipt therewithin of said bearing and a hub alignment boss located at the opposite face of said mounting flange to be received within said hub receiving pocket, said hub having a shaft pass-through running longitudinally therethrough for the receipt of said shaft, such that said shaft is coaxially aligned with each of the shaft passage of said bearing and the shaft pass-through of said hub so as to be aligned with and coupled to the driving rotor of said pump.

2. The pump assembly recited in claim 1, wherein said pump is a gear pump, and the driving rotor of said gear pump is surrounded by said driven rotor, said driving rotor having a plurality of teeth and said driven rotor having a corresponding plurality of pockets in which to receive respective ones of said plurality of teeth, whereby said driven rotor is coupled to said driving rotor and the rotation of said driving rotor is imparted to said driven rotor.

3. The pump assembly recited in claim 1, wherein said bearing has a cylindrical inner race that surrounds said shaft passage, a cylindrical outer race that surrounds said inner race for receipt within said hub, a ball bearing track extending circumferentially around said inner race, and a plurality of ball bearings located in said ball bearing track to lie between said inner and outer races, wherein the inner race of said bearing is connected to said shaft so as to rotate therewith.

4. The pump assembly recited in claim 1, wherein there is a shaft receiving opening formed through the front cover of said pump assembly that communicates with said hub receiving pocket, said shaft being coupled to the driving rotor of said pump by way of said shaft receiving opening when said hub is received within said hub receiving pocket and said bearing is surrounded by said hub.

5. The pump assembly recited in claim 1, wherein the mounting flange of said hub has a plurality of bolt holes, said pump assembly further comprising a corresponding plurality of bolts to be received through respective ones of said plurality of bolt holes to be attached to said front cover by which the mounting flange of said hub is connected to said front cover and the hub alignment boss of said hub is held within the hub receiving pocket of said front cover.

6. The pump assembly recited in claim 1, wherein the front cover of said pump assembly has first and opposite sides, the mounting flange of said hub being connected to the first side of said front cover and the opposite side of said front cover having fluid inlet and fluid discharge ports that communicate with the pump of said pump assembly, such that the fluid to be pumped by said pump assembly is supplied to said pump through said fluid inlet port and the fluid that is pumped from said pump assembly is pumped by said pump through said fluid discharge port.

7. The pump assembly recited in claim 1, further comprising a cylindrical high pressure seal located in the hub alignment boss of said hub at which to surround the shaft within the shaft pass-through that runs longitudinally through said hub.

* * * * *